US008068286B2

(12) United States Patent
Horiguchi et al.

(10) Patent No.: US 8,068,286 B2
(45) Date of Patent: Nov. 29, 2011

(54) VARIABLE FOCAL LENS AND IMAGING APPARATUS

(75) Inventors: Shuichi Horiguchi, Kanagawa (JP);
Gentarou Irisawa, Kanagawa (JP);
Yuichiro Mori, Kanagawa (JP);
Masafumi Mizuno, Kanagawa (JP);
Yasuji Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 554 days.

(21) Appl. No.: 12/293,073

(22) PCT Filed: Mar. 16, 2007

(86) PCT No.: PCT/JP2007/055368
§ 371 (c)(1),
(2), (4) Date: Sep. 15, 2008

(87) PCT Pub. No.: WO2007/105824
PCT Pub. Date: Sep. 20, 2007

(65) Prior Publication Data
US 2009/0086336 A1 Apr. 2, 2009

(30) Foreign Application Priority Data

Mar. 16, 2006 (JP) .................................. 2006-072700
Aug. 3, 2006 (JP) .................................. 2006-211928

(51) Int. Cl.
*G02B 15/14* (2006.01)
*G02B 21/00* (2006.01)
*G03B 17/00* (2006.01)
*G03B 27/52* (2006.01)
(52) U.S. Cl. ............. 359/698; 359/382; 396/79; 355/55
(58) Field of Classification Search .......... 359/379–380, 359/383, 384, 410, 425–426, 684, 695–706, 359/822–826; 396/77–82; 355/55–56
See application file for complete search history.

(56) References Cited

U.S. PATENT DOCUMENTS 4,705,380 A * 11/1987 Yamamoto et al. ............. 396/80
(Continued)

FOREIGN PATENT DOCUMENTS

EP 1 531 618 A1 5/2005
(Continued)

OTHER PUBLICATIONS

European Search Report for EP07738813; Aug. 19, 2010.
(Continued)

*Primary Examiner* — Dawayne Pinkney
(74) *Attorney, Agent, or Firm* — Pearne & Gordon LLP

(57) ABSTRACT

A variable focal lens which does not require a reduction of a zoom factor and eliminates an origin sensor is provided. A microcomputer 15 functions as a focus adjustment section which controls a stepper motor 13 to move a focusing ring 5 for a focus adjustment. The microcomputer 15 causes the focusing ring 5 to move by a first moving distance in a first moving direction toward one of a FAR side and a NEAR side, and then to move the focusing ring 5 by a second moving distance in a second moving direction opposite to the first moving direction, and set the point where the focusing ring reaches after the movement in the second moving direction as a reference point for adjustment, and the microcomputer 15 causes the focusing ring 5 to move from the reference point for adjustment in the first moving direction within a range equal to or less than the second moving distance to carry out the focus adjustment. This configuration eliminates margins provided by software at ends of the movement range of the focusing ring 5.

11 Claims, 15 Drawing Sheets

U.S. PATENT DOCUMENTS

| | | | |
|---|---|---|---|
| 4,967,218 A | 10/1990 | Numako et al. | |
| 5,345,288 A | 9/1994 | Kobayashi et al. | |
| 6,819,799 B1 | 11/2004 | Sakaguchi | |
| 6,825,883 B1 | 11/2004 | Hata | |
| 2011/0001847 A1* | 1/2011 | Iwasaki | 348/240.3 |

FOREIGN PATENT DOCUMENTS

| | | |
|---|---|---|
| JP | 64-007774 A | 1/1989 |
| JP | 01257924 A | 10/1989 |
| JP | 01-284181 A | 11/1989 |
| JP | 03-236038 A | 10/1991 |
| JP | 06-217180 | 8/1994 |
| JP | 06-225198 A | 8/1994 |
| JP | 8-062487 | 3/1996 |
| JP | 10-104499 | 4/1998 |
| JP | 10-224682 | 8/1998 |
| JP | 11-084219 | 3/1999 |

OTHER PUBLICATIONS

Japanese Office action; Oct. 12, 2010.

International Search Report for PCT/JP2007/055368, completed Jun. 1, 2007.

European Office Action for Application No. 07 783 813.0-1524 dated Aug. 5, 2011.

* cited by examiner

VARIABLE FOCAL LENS AND IMAGING APPARATUS

CROSS REFERENCE TO RELATED APPLICATION

This patent application claims priority from Japanese Patent Application No. 2006-72700 filed on 16 Mar. 2006 and Japanese Patent Application No. 2006-211928 filed on 3 Aug. 2006, which are incorporated herein by reference in their entirety.

TECHNICAL FIELD

The present invention relates to a variable focal lens having an automatic focusing function.

BACKGROUND ART

Conventionally, a variable focal lens (generally, which is sometimes called as a varifocal lens, and the same will be applied hereinafter) is known as a simplified zoom lens, and is used in a monitoring camera for example. While a normal zoom lens automatically adjusts its focus in accordance with zooming, a variable focal lens requires a readjustment of its focus upon zooming.

A focus adjustment of a variable focal lens is performed by manually rotating a focusing ring which is provided around a barrel of a camera to which the lens is mounted. However, the manual rotation of the focusing ring sometimes only results in an inadequate focus adjustment. For example, assume that a variable focal lens is mounted to a monitoring camera. In an installation, the monitoring camera is often set at a place remote from a monitor. In this case, one worker operates the camera while the other worker watches the monitor, so that the two workers cooperate for a focus adjustment. Thus, it is not easy to obtain an accurate focus in the installation. As another example, assume that a monitoring camera is installed during day time. In comparison between day time and night time, the depth of field is narrower during night time. So, even if an accurate focus is manually obtained during day time, the focus may be offset during night time.

Therefore, a variable focal lens preferably has an automatic focusing function. A conventional automatic focusing function applied to a variable focal lens is structured to detect a high frequency component of an image signal during a movement of a focus ring, and to stop the focusing ring at a position where the maximum value of the high frequency component is obtained. Such automatic focusing technology is disclosed in Japanese Patent Application Laid-Open No. 6-217180, for example.

FIG. 12 shows an conventional imaging apparatus having a variable focal lens which is provided with a automatic focusing function. In FIG. 12, an imaging apparatus 101 includes, as a structure for image pickup, a zoom ring 103, a focusing ring 105, an imaging element 107, a camera DSP 109, and a video circuit 111. The zoom ring 103 and the focusing ring 105 are provided with a plurality of lenses which form a subject image onto the imaging element 107, where the subject image is converted into electrical signals. The output signals from the imaging element 107 are supplied to the video circuit 111 after a processing at the camera DSP 109.

The zoom ring 103 and the focusing ring 105 can be manually operated separately. In operation, each ring is rotated around an optical axis, which causes a lens which is supported by the ring to move along the optical axis. A movement of the zoom ring 103 achieves a zooming, thereby an angle of view is adjusted. A movement of the focusing ring 105 achieves a focus adjustment.

For an automatic focusing function, the imaging apparatus 101 includes a stepper motor 113, a microcomputer 115, and an origin sensor 117.

The stepper motor 113 is provided to the focusing ring 105 so as to move the focusing ring 105 to a FAR side and a NEAR side. The stepper motor 113 is controlled by the microcomputer 115.

The microcomputer 115 has an up/down counter incorporated therein, so that a count value by the up/down counter is used to control the rotation of the stepper motor 113 to control the position of the focusing ring 105.

The origin sensor 117 detects the arrival of the focusing ring 105 at a predetermined position of an origin. Based on an output from the origin sensor 117, the microcomputer 115 detects an absolute position of the focusing ring 105. The origin sensor 117 is typically a photo interrupter type sensor, and detects the presence/absence of a shield which is provided to the focusing ring 105. The shield is arranged so that the connection of the origin sensor 117 is switched between both sides of the origin. This arrangement allows the origin sensor 117 to detect which side of the origin the focusing ring 105 is located on.

The microcomputer 115 controls the position of the focusing ring 105 based on a focus evaluation value which is supplied from the camera DSP 109. The focus evaluation value is a signal which represents the value of a high frequency component of image signals, and the camera DSP 109 produces a focus evaluation value from an output signal of the imaging element 107. The microcomputer 115 causes the focusing ring 105 to move to a focus alignment position (a position which achieves an accurate focus, or provides optimum focus, the same will be applied hereinafter) based on a change of the focus evaluation value due to the movement of the focusing ring 105. The focus alignment position is located at a position where the high frequency component of the image signals is the maximum.

FIG. 13A to FIG. 13C show auto-focus controls of a conventional variable focal lens. In each figure, a position of a focusing ring and its change are shown, and a NEAR side is on the left side and a FAR side is on the right side. FIG. 13A to FIG. 13C show examples having different start positions of the focusing ring 105 and different focus alignment positions (the positions after auto focus). In FIG. 13A, FIG. 13B, and FIG. 13C, the start position and the focus alignment position are located in the middle of a focusing ring movement range, near the FAR end, and near the NEAR end, respectively.

In the conventional auto-focus control, as shown in the FIG. 13A to FIG. 13C, ends provided by software are set between mechanical ends. The mechanical ends correspond to the ends of the focusing ring movement range, and are the positions where the rotation of a motor is mechanically limited. The software ends correspond to the ends of a focusing ring moving range which are set on the software of the microcomputer 115 to prevent the focusing ring 105 from reaching the mechanical ends.

In the auto-focus control, first, the microcomputer 115 determines whether the focusing ring 105 is located on the FAR side or on the NEAR side relative to the origin sensor 117, based on output of the origin sensor 17. Then, the microcomputer 115 causes the focusing ring 105 to move toward the origin sensor 117. In the examples of FIG. 13A and FIG. 13B, the focusing ring 105 is moved toward the NEAR side, and in the example of FIG. 13C, the focusing ring 105 is moved toward the FAR side. In order to eliminate backlash, an origin search operation is surely performed in the direction to the FAR side, and at the moment when the operation passes the origin, the up/down counter is reset.

Next, the microcomputer 115 causes the focusing ring 105 to reciprocate between the software ends at a high speed while detecting a focus alignment position, so that the microcomputer 115 approximately detects the focus alignment position. At this time, in order to eliminate backlash, the detection is surely performed in the direction to the FAR side.

Furthermore, the microcomputer 115 causes the focusing ring 105 to reciprocate at a low speed this time across the focus alignment position which was detected by the previous movement at a high speed, so that the microcomputer 115 accurately detect the focus alignment position. Finally, the microcomputer 115 causes the focusing ring 105 to stop at the focus alignment position. At this point also, in order to eliminate backlash, the microcomputer 115 surely causes the focusing ring 105 to move in the direction to the FAR side before the stopping.

As described above, the conventional variable focal lens uses the origin sensor 117 to detect an origin so as to control an absolute position of the focusing ring 105.

In addition, in the conventional variable focal lens as described above, the software ends are set between the mechanical ends of the focusing ring 105, and the focusing ring 105 is controlled not to reach the mechanical ends. This configuration is provided to prevent a step out of the stepper motor 113 at the mechanical ends. The step out means that a control position of the stepper motor and an actual position of the stepper motor are offset from each other. If the focusing ring 105 reaches a mechanical end, any supply of a driving signal does not cause the stepper motor 113 to rotate, resulting in a step out. Once a step out is caused, the position of the stepper motor 113 and the count value of the up/down counter do not correspond to each other, and the absolute position cannot be found. Thus, in order to prevent a step out, the software ends are set between the mechanical ends, which in turn provides margins at both ends.

However, in the conventional variable focal lens, the margins should be provided at both ends of a focusing ring movement range as described above, and disadvantageously a substantial zoom factor has to be reduced as compared to an optical design zoom factor.

Moreover, in the conventional variable focal lens, an origin sensor should be provided, which increases a cost and makes a barrel structure complexed.

The present invention was made in view of the above described background, and one object of the present invention is to provide a variable focal lens which does not require a reduction of a zoom factor, and does not need an origin sensor.

DISCLOSURE OF THE INVENTION

A variable focal lens of the present invention includes: a zoom ring; a focusing ring; a stepper motor for moving the focusing ring to a FAR side and a NEAR side; and a focus adjustment section for controlling the stepper motor to move the focusing ring for a focus adjustment, and wherein the focus adjustment section causes the focusing ring to move by a first moving distance in a first moving direction toward one of the FAR side and the NEAR side, then causes to move the focusing ring by a second moving distance which is larger than the first moving distance and equal to or less than a focusing ring movement range in a second moving direction opposite to the first moving direction, and set the end point where the focusing ring reaches after the movement in the second moving direction as a reference point for adjustment, and the focus adjustment section causes the focusing ring to move from the reference point for adjustment in the first moving direction within a range equal to or less than the second moving distance to carry out the focus adjustment. Herein, the first moving distance and the second moving distance may be preset to certain values. Alternatively, as in the examples which will be explained later, the first moving distance and the second moving distance may be variable, and of the two, the second moving distance may be determined depending on the first moving distance.

Another aspect of the present invention is an imaging apparatus, including: a zoom ring; a focusing ring; an imaging element; a stepper motor for moving the focusing ring to a FAR side and a NEAR side; and a focus adjustment section for controlling the stepper motor according to a focus evaluation value which is generated from an image signal of the imaging element so as to move the focusing ring for a focus adjustment, and the focus adjustment section causes the focusing ring to move by a first moving distance in a first moving direction toward one of the FAR side and the NEAR side, then causes to move the focusing ring by a second moving distance which is larger than the first moving distance and equal to or less than a focusing ring movement range in a second moving direction opposite to the first moving direction, and set the end point where the focusing ring reaches after the movement in the second moving direction as a reference point for adjustment, the focus adjustment section causes the focusing ring to move from the reference point for adjustment in the first moving direction within a range equal to or less than the second moving distance to carry out the focus adjustment.

A further aspect of the present invention is an auto-focusing method of a varifocal lens, and the method is applied to a variable focal lens having a zoom ring, a focusing ring, and a stepper motor for moving the focusing ring to a FAR side and a NEAR side, and including controlling the stepper motor to move the focusing ring. The method includes: moving the focusing ring by a first moving distance in a first moving direction toward one of the FAR side and the NEAR side; moving the focusing ring by a second moving distance which is set to be larger than the first moving distance and equal to or less than a focusing ring movement range in a second moving direction opposite to the first moving direction; setting the end point where the focusing ring reaches after the movement in the second moving direction as a reference point for adjustment; and moving the focusing ring from the reference point for adjustment in the first moving direction within a range equal to or less than the second moving distance to carry out the focus adjustment.

The present invention can provide a variable focal lens which is configured to appropriately control a movement of a focusing ring as described above and thereby advantageously a zoom factor is not reduced and no origin sensor is needed in there.

As will be explained below, the present invention includes other aspects. Therefore, this disclosure is intended to provide a part of aspects of the present invention, and is not intended to limit the scope of the invention described and claimed herein.

Figure 1:
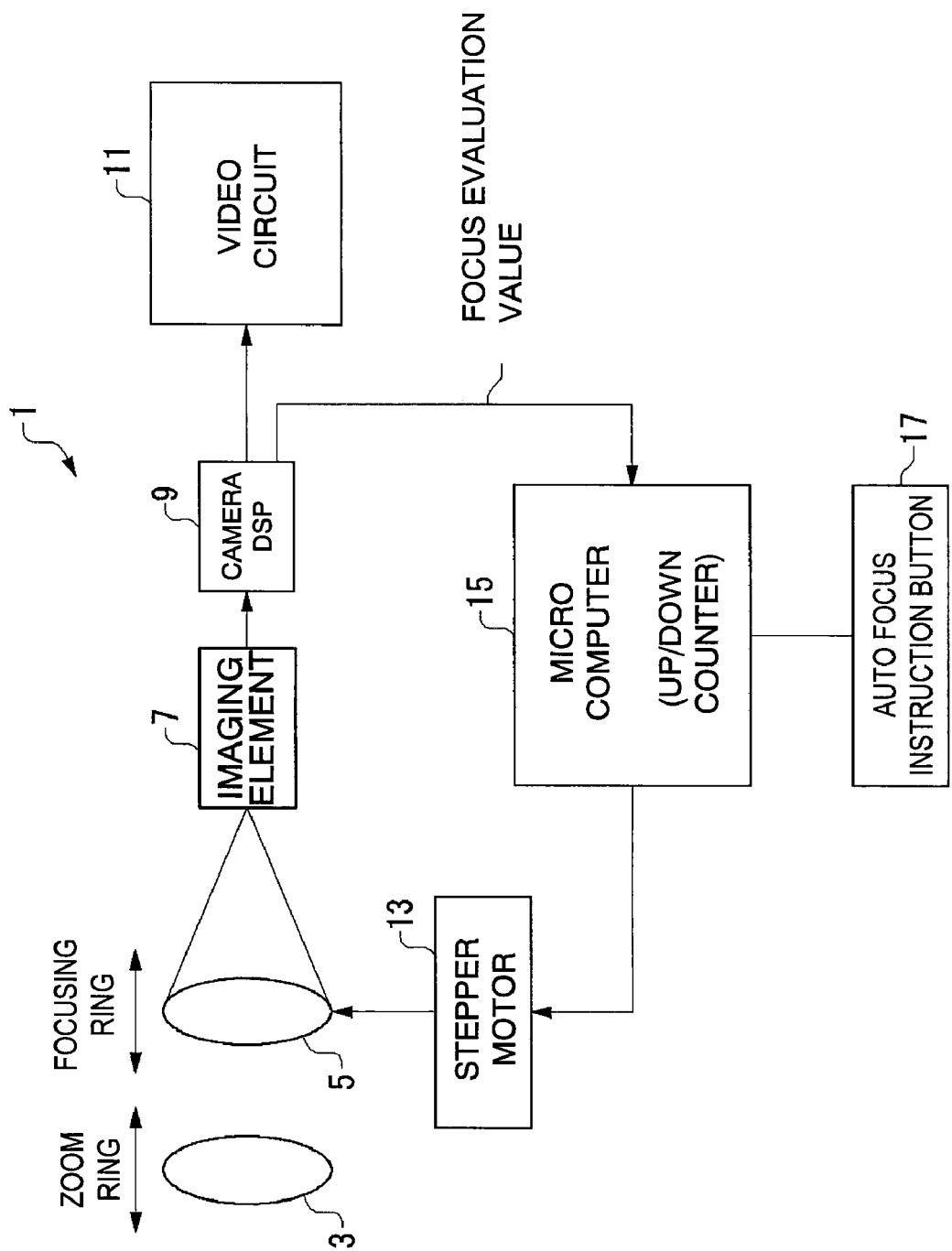
FIG. 1 is a view showing an imaging apparatus having a variable focal lens according to an embodiment of the present invention.

DESCRIPTION OF SYMBOLS 1 imaging apparatus
3 zoom ring
5 focusing ring
7 imaging element
9 camera DSP
11 video circuit
13 stepper motor
15 microcomputer

BEST MODE FOR CARRYING OUT THE INVENTION

Now, the present invention will be explained below in detail. However, the following detailed explanation and the accompanying drawings are not intended to limit the present invention. Instead, the scope of the invention is defined by the appended claims.

A variable focal lens of the present invention includes: a zoom ring; a focusing ring; a stepper motor for moving the focusing ring to a FAR side and a NEAR side; and a focus adjustment section for controlling the stepper motor to move the focusing ring for a focus adjustment, and wherein the focus adjustment section causes the focusing ring to move by a first moving distance in a first moving direction toward one of the FAR side and the NEAR side, and then to move the focusing ring by a second moving distance which is larger than the first moving distance and equal to or less than a focusing ring movement range in a second moving direction opposite to the first moving direction, and set the end point where the focusing ring reaches after the movement in the second moving direction as a reference point for adjustment, and the focus adjustment section causes the focusing ring to move from the reference point for adjustment in the first moving direction within a range equal to or less than the second moving distance to carry out the focus adjustment. Herein, the first moving distance and the second moving distance may be preset to certain given values. Alternatively, as in the examples which will be explained later, the first moving distance and the second moving distance may be variable, and of the two, the second moving distance may be determined depending on the first moving distance.

In the configuration, a movement of a focusing ring is controlled based on a reference point for adjustment as above described, thereby a focus alignment position can be detected without a control of an absolute position based on a certain fixed origin. Moreover, a focus alignment position can be successfully detected without the necessity of margins provided by software at the ends of a movement range. Therefore, a variable focal lens can be provided in which a reduction of a zoom factor is not required and no origin sensor is needed.

In addition, the first moving distance may be set at 1/8 or less distance of the focusing ring movement range, and the second moving distance may be set at 1/4 or less distance that of the focusing ring movement range. The configuration enables a reduction of a moving distance of a focusing ring for a focus adjustment, resulting in the achievement of a focus adjustment in a shorter period of time. Also, a focus adjustment can be achieved by low speed driving, as compared to the prior art which uses a combination of high speed driving and low speed driving.

Furthermore, the second moving distance may be set to twice that of the first moving distance. This configuration enables a preferable detection of a focus alignment position from adequate regions on both sides of a start position for a focus adjustment.

The focus adjustment section may include a TELE/WIDE detecting section which detects whether the zoom ring is located on a TELE side or a WIDE side, so that the first moving distance with the zoom ring being on the WIDE side may be longer as compared to the first moving distance with the zoom ring being on the TELE side.

The configuration causes the moving distance with the zoom ring being on the WIDE side to be set longer as compared to the first moving distance with the zoom ring being on the TELE side. Therefore, on the Tele side, the period for the focus adjustment can be shortened by reducing the focusing ring moving distance, while, on the WIDE side, the focus adjustment can be surely achieved by securing the adequate focusing ring moving distance.

In addition, the TELE/WIDE detecting section may employ a focus evaluation value which represents an integrated value for spatial frequency characteristics of an image signal, so as to detect whether the zoom ring is located on a TELE side or a WIDE side in response to the amount of change in the focus evaluation values, based on the characteristics of the focus evaluation value: that is, the amount of change in the focus evaluation values when the focusing ring moves is smaller on the WIDE side as compared to the TELE side. This configuration using a focus evaluation value enables a detection of a focus ring on a TELE side and a WIDE side without using a special sensor or the like. Thus, the present invention can be achieved with a simple structure.

Also, the focus adjustment section may set the reference first moving distance as a first moving distance when the zoom ring is located on the TELE side, and may set a distance which is obtained by adding an extended first moving distance to the reference first moving distance as a first moving distance when the zoom ring is located on the WIDE side. In this configuration, different first moving distances can be preferably set depending on the location of the zoom ring on the TELE side or the WIDE side.

The TELE/WIDE detecting section may detect a TELE side/WIDE side using a focus evaluation value while the focusing ring is moving in the first moving direction by a reference first moving distance.

This configuration enables a determination if an extended first moving distance is to be added or not by detecting a TELE side/WIDE side during a movement by a reference first moving distance. A TELE/WIDE detecting process is done during a movement by a reference first moving distance. Therefore, although a focus evaluation value obtained from an image signal is used, a focus adjustment can be rapidly achieved without wasting time in a TELE/WIDE detecting process.

The present invention is not limited to a variable focal lens according to the above aspects. The present invention includes other aspects which are for example an imaging apparatus and an auto-focus method as described above. These other aspects are also configured to achieve a focus adjustment explained in the variable focal lens according to the above aspect. Also, the additional conditions with respect to the imaging apparatus may be applied to the other aspects as well. The other aspects provide the advantages same as those of the aspects of a variable focal lens.

Now, a variable focal lens according to embodiments of the present invention and an imaging apparatus having the same will be explained below with reference to the drawings.

First Embodiment

FIG. 1 shows an imaging apparatus having a variable focal lens according to an embodiment of the present invention. In FIG. 1, an imaging apparatus 1 includes: as a structure for an imaging or image pickup, a zoom ring 3; a focusing ring 5; an imaging element 7, a camera DSP 9; and a video circuit 11. The zoom ring 3 and the focusing ring 5 are provided with a plurality of lenses which forms a subject image on the imaging element 7, where the subject image is converted into an electrical signal. The output signal from the imaging element 7 is processed at the camera DSP 9 to be supplied to the video circuit 11.

The zoom ring 3 and the focusing ring 5 are arranged in parallel around a barrel, and can be manually operated separately. In operation, each ring is rotated around an optical axis, which causes a lens which is supported by the ring to move along the optical axis. A movement of the zoom ring 3 achieves a zooming, thereby an angle of view is adjusted. A movement of the focusing ring 5 achieves a focus adjustment.

As a structure for an automatic focusing function, the imaging apparatus 1 includes a stepper motor (stepping motor) 13 and a microcomputer 15. Unlike a conventional imaging apparatus, an origin sensor is eliminated.

The stepper motor 13 is mounted to the focusing ring 5, and causes the focusing ring 5 to move to a FAR side and a NEAR side. The stepper motor 13 is controlled by the microcomputer 15.

The microcomputer 15 has an up/down counter incorporated therein, so that a count value by the up/down counter is used to control the rotation of the stepper motor 13 to control the position of the focusing ring 5. The microcomputer 15 corresponds to a focus adjustment section of the present invention. The up/down counter may be provided in a driver IC of the stepper motor 13.

The imaging apparatus 1 further includes an auto-focus instruction button 17. Upon a press of the auto-focus instruction button 17, the microcomputer 15 controls the stepper motor 13 to perform a focus adjustment. However, within the scope of the present invention, an auto-focus adjustment may be performed in response to a trigger other than the button operation. For example, an auto-focus instruction may be sent to the imaging apparatus 1 via a communication.

The microcomputer 15 controls the position of the focusing ring 5 based on a focus evaluation value supplied from the camera DSP 9. The focus evaluation value is a signal representing a value of a high frequency component of an image signal, and is generated by the camera DSP 9 using an output signals from the imaging element. The microcomputer 15 causes the focusing ring 5 to move to a focus alignment position (a just focus position, a position which achieves an accurate focus, or provides optimum focus, the same will be applied hereinafter) based on the amount of change in focus evaluation values upon a movement of the focusing ring 5. The focus alignment position is that where the high frequency component of the image signals is the maximum.

Figure 2:
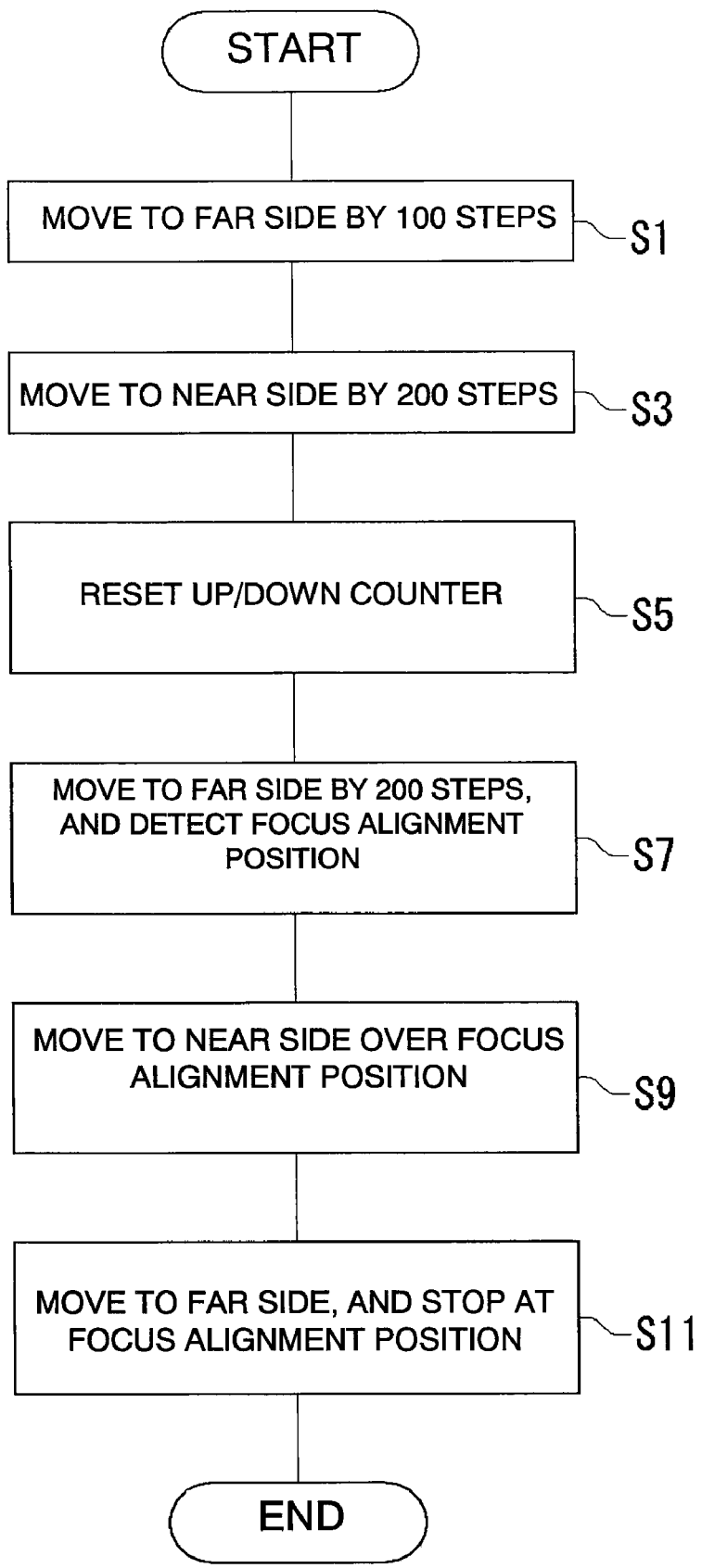
FIG. 2 is a flowchart showing an automatic focusing operation of a variable focal lens according to the present embodiment.

FIG. 2 shows an automatic focusing operation of the imaging apparatus 1 according to the present embodiment. FIG. 2 is a flowchart of a control by the microcomputer 15. In the following explanation, the number of steps is that of the stepper motor 13 which is counted by an up/down counter. Since the number of steps corresponds to a movement distance of the focusing ring 5 in one-to-one correspondence, a movement distance of the focusing ring 5 will be represented by the number of steps in the following explanation. In the example of the present embodiment, the 100 steps corresponds to about ⅛ of a focusing ring movement range (a mechanical movement range of the focusing ring 5), and the 200 steps corresponds to about ¼ of the focusing ring movement range.

As shown in FIG. 2, first, the microcomputer 15 causes the focusing ring 5 to move to the FAR side by 100 steps (S1), and then, to the NEAR side by 200 steps (S3), and resets the up/down counter (S5). The position of the focusing ring 5 is set as a reference point for adjustment. Next, the microcomputer 15 causes the focusing ring 5 to move to the FAR side by 200 steps while a focus alignment position is detected (S7).

Then the microcomputer 15 causes the focusing ring 5 to move to the NEAR side to a position over the detected focus alignment position (S9). Finally, the microcomputer 15 causes the focusing ring 5 to move to the FAR side and stop at the focus alignment position (S11).

In the above process, the detection of focus alignment position at Step S7 is performed during a movement to the FAR side. The stopping control at Step S11 is also is performed during a movement to the FAR side. These are intended to eliminate backlash.

In the above control, the moving ranges are set to the 100 steps and the 200 steps. The 100 steps and the 200 steps correspond to about ⅛ and ¼ of the focusing ring movement range respectively as described above. In this way, the moving ranges of the focusing ring 5 are set to be relatively narrow, thereby the range to be searched for a focus alignment position is set to be relatively narrow. The reason why a focus adjustment can be achieved within such a narrow moving range is as follows.

Figure 3:
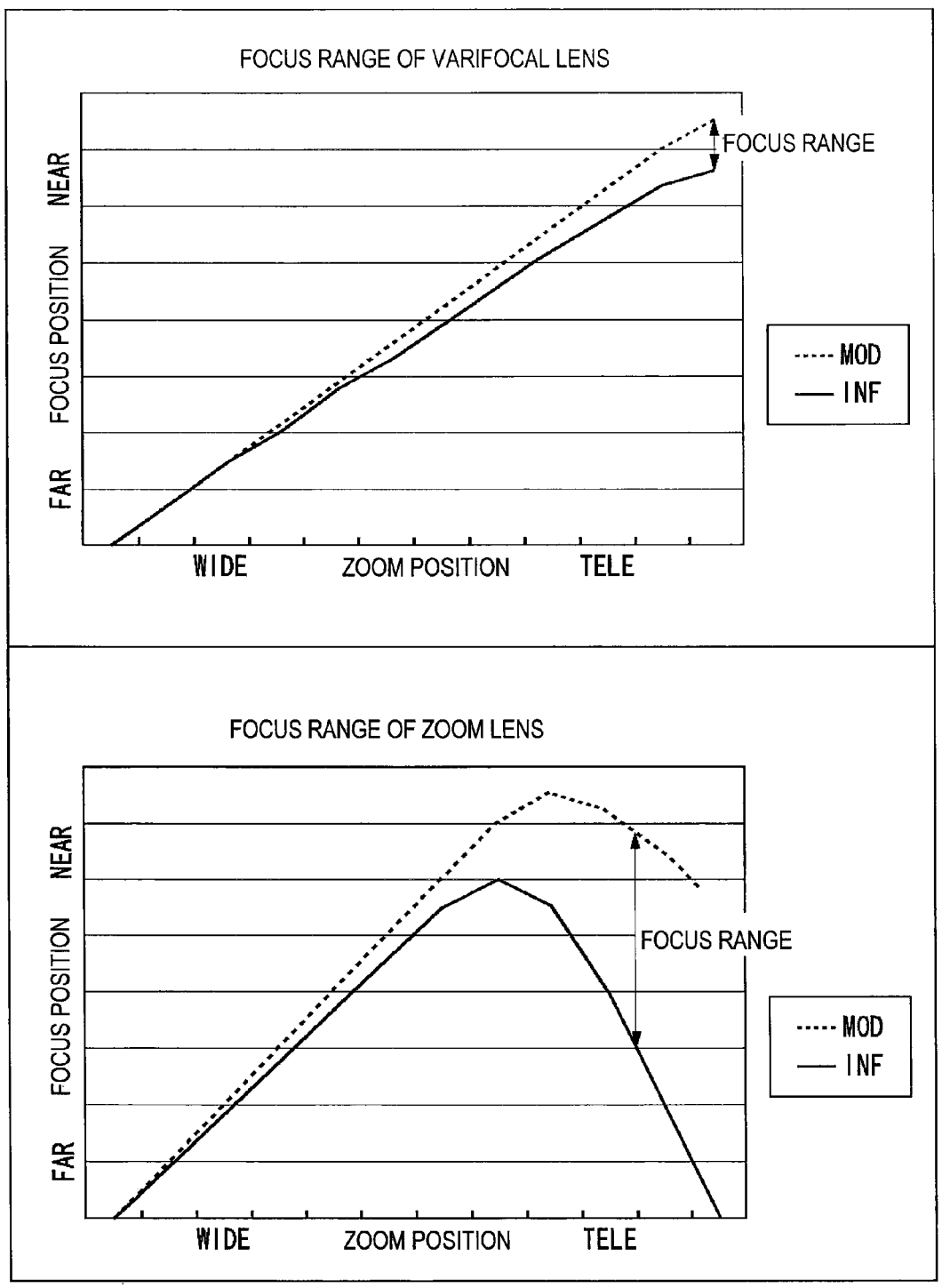
FIG. 3 is a view showing a focus range of a variable focal lens and a focus range of a normal zoom lens.

FIG. 3 shows a focus range of a variable focal lens, and a focus range of a normal zoom lens. In FIG. 3, the horizontal axis represents the angle of view with WIDE on the left side and TELE (telescope) on the right side. The vertical axis represents the focus position. The solid lines represent INF (Infinity) and the dotted lines represent MOD (Minimum Object Distance) in the graphs.

As shown in FIG. 3, the focus range of the variable focal lens is characterized by its narrow range both on the WIDE side and the TELE side, unlike that of the zoom lens. Due to the narrow focus range, the focusing is generally obtained along the process of the angle of view adjustment. Therefore, a focus alignment position can be found by a search only around the focusing ring position at the beginning of a focus adjustment. This will be explained in detail below by way of examples.

Herein a monitoring camera is taken as an example. A variable focal lens which is a simplified zoom lens is widely spread as a lens used in a monitoring camera. In mounting a monitoring camera, a worker manually rotate a zoom ring and a focusing ring separately for an adjustment of angle of view and a focus adjustment. At this point, assume that the worker tries to adjust only an angle of view. In this case, because the focus range of the variable focal lens is narrow as shown in FIG. 3, the focus is considerably shifted, and a resulting image would be blurred. That is, it is actually impossible to adjust an angle of view alone. Thus, a worker simultaneously achieves both of an adjustment of angle of view and a focus adjustment by rotating both of a zoom ring and a focusing ring. In such a work, a focus can be generally obtained in the process for an adjustment of angle of view. Therefore, a focus alignment position can be found in a narrow range to be searched for focus adjustment as in the control of the present invention.

Figure 4:
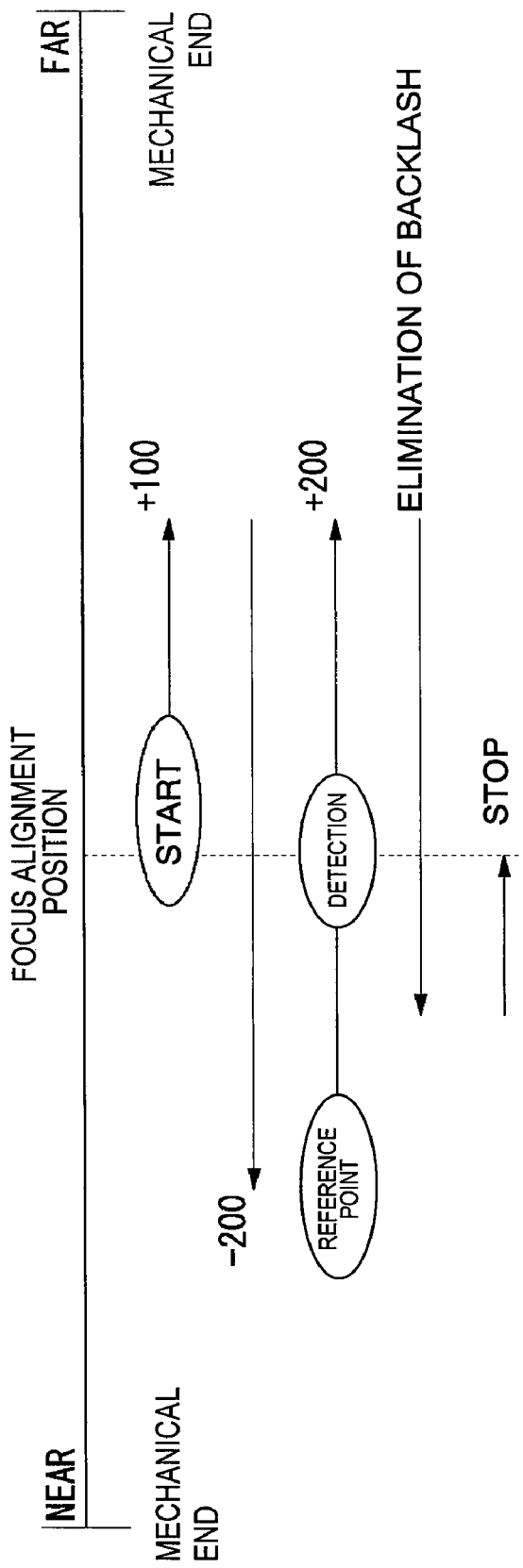
FIG. 4 is a view showing an example of an automatic focusing operation in which a focus alignment position is located around the center.
Figure 5:
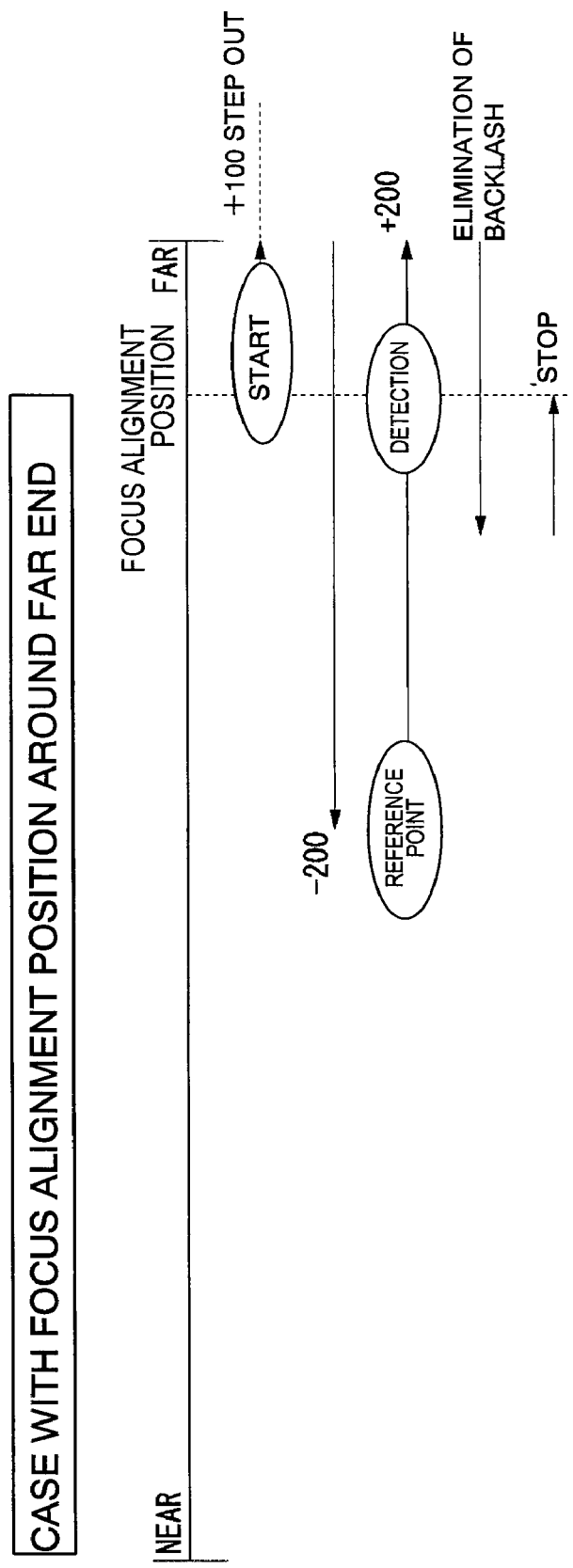
FIG. 5 is a view showing an example of an automatic focusing operation in which a focus alignment position is located near a FAR end.
Figure 6:
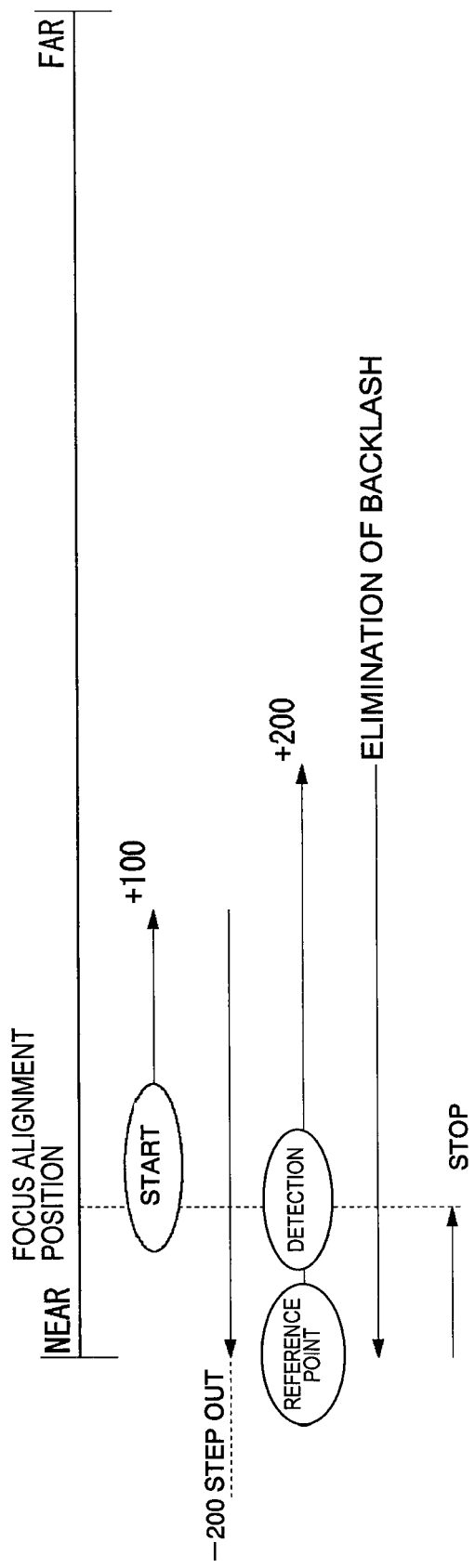
FIG. 6 is a view showing an example of an automatic focusing operation in which a focus alignment position is located near a NEAR end.

FIG. 4 to FIG. 6 show examples of an automatic focusing operation of the present embodiment. FIG. 4 to FIG. 6 show the changes of a position of the focusing ring 5 with NEAR side on the left side and FAR side on the right side. A NEAR end and a FAR end are mechanical ends. Unlike the conventional lens, no margin with software ends is provided.

In the example of FIG. 4, the starting point of the focusing ring 5 (the position before auto-focus) and a focus alignment position (the position after auto-focus) are located around the center of the focusing ring movement range.

In this case, under the control of the microcomputer 15, the focusing ring 5 is advanced to the FAR side by 100 steps, and then to the NEAR side by 200 steps. Then, the up/down counter is reset, and the focusing ring 5 is advanced to the FAR side by 200 steps, with a focus alignment position being found in this process. Moreover, the focusing ring 5 is moved to the NEAR side over the focus alignment position, and then moved to the FAR side and stopped at the focus alignment position. In this example, no step out of the stepper motor 13 at both ends of the focusing ring movement range occurs.

Next, in the example of FIG. 5, the starting point of the focusing ring 5 and a focus alignment position are located near the FAR end of the focusing ring movement range. In this case, in the first process for moving the focusing ring 5 to the FAR side by 100 steps, the stepper motor 13 is stepped out, and the focusing ring 5 is stopped at the FAR end. Next, the focusing ring 5 is advanced to the NEAR side by 200 steps. Then the up/down counter is reset, and focusing ring is advanced to the FAR side by 200 steps, with a focus alignment position being found in this process. Moreover, the focusing ring 5 is moved to the NEAR side over the focus alignment position, and then moved to the FAR side and stopped at the focus alignment position.

In this example, a step out occurs in the first movement to the FAR side. However, in the subsequent process, the focusing ring 5 is moved back to the NEAR side by 200 steps, so that a reference point for adjustment is set. After the setting, the focusing ring 5 is not moved to the FAR side by more than 200 steps. So, after the reference point for adjustment is set, no step out occurs. In this way a focus alignment position can be accurately detected, and the focusing ring 5 can be accurately stopped at the focus alignment position.

Next, in the example of FIG. 6, the starting point of the focusing ring 5 and a focus alignment position are located near the NEAR end of the focusing ring movement range. In this case, the stepper motor 13 steps out in the process for moving the focusing ring 5 to the FAR side by 100 steps and then to the NEAR side by 200 steps, and the focusing ring 5 stops at the NEAR end. At the NEAR end, the up/down counter is reset, and the focusing ring 5 is advanced to the FAR side by 200 steps, with a focus alignment position being found in this process. Moreover, the focusing ring 5 is moved to the NEAR side over the focus alignment position, and then moved to the FAR side and stopped at the focus alignment position.

In this example, a step out occurs in the process for moving back to the NEAR side by 200 steps, and the focusing ring 5 stops there at the NEAR end. So, the up/down counter is reset at the NEAR end, and the NEAR end is set as a reference point for adjustment. Then, the focusing ring 5 is moved to the FAR side by 200 steps to detect a focus alignment position. After the movement, the focusing ring 5 is not moved to the NEAR side by more than 200 steps, and is stopped at the focus alignment position. So, after the reference point for adjustment is set, no step out occurs. In this way a focus alignment position can be accurately detected, and the focusing ring 5 can be accurately stopped at the focus alignment position.

As explained above by way of three examples, in the present embodiment, the control shown in FIG. 2 allows a focus alignment position to be detected without any problem wherever the starting position of the focusing ring 5 is located in a focusing ring movement range, and allows the focusing ring 5 to be moved to the detected focus alignment position. Specifically, the control of the present embodiment uses a reference point for adjustment which is set by a first reciprocating movement, as described above, instead of a fixed origin. Moreover, this improved control allow an occurrence of step out before the setting of a reference point for adjustment. Therefore, the present embodiment achieves a preferable control for focus adjustment regardless of a location of the focusing ring 5 and without margins and software ends.

Next, a modified example of the above embodiment will be explained below. In the above described example, the focusing ring 5 is moved in the FAR direction, in the NEAR direction, and in the FAR direction in order. However, the focusing ring 5 may be moved in the opposite way, that is, in the NEAR direction, in the FAR direction, and in the NEAR direction in order. In other words, in the above described example, the FAR direction and the NEAR direction correspond to the first moving direction and the second moving direction of the present invention respectively, but in the modified example, the NEAR direction may correspond to the first moving direction, and the FAR direction may correspond to the second moving direction.

Also, in the above described example, the first moving distance in the first moving direction (the FAR direction) was equal to 100 steps, and the next second moving distance in the second moving direction (the NEAR direction) was equal to 200 steps. However, within the scope of the present invention, the moving distance may be variable. The second moving distance may be set to be larger than the first moving distance and equal to or less than the focusing ring movement range. Both distances are set so that the focusing ring 5 passes over a focus alignment position in a movement by the first moving distance and the second moving distance.

However, the moving distances such as 100 steps and 200 steps as described above correspond to ⅛ and ¼ of the focusing ring movement range respectively, which is relatively narrow. As already explained above, the distances are set to be narrow in consideration of the characteristics of a variable focal lens that it has a narrow focus range. Such narrow moving distances provide an advantage that the time required for an automatic focusing operation can be reduced. Moreover, in the prior art, due to a long moving distance, a combination of a reciprocating movement at a high speed and a reciprocating movement at a low speed is used. To the contrary, in the present embodiment, due to a short moving distance, the focusing ring 5 can be moved at a low speed from the start. In this point also, the setting of moving distances as described above are advantageous.

Furthermore, although the second moving distance is twice that of the first moving distance in the above example, the ratio is not limited to the above example within the scope of the present invention. However, generally, a focus alignment position may exist on either side of a starting position of the focusing ring 5 at the same probability. In consideration with this point, the second moving distance which is twice that of the first moving distance provides an advantage because both sides of the starting position can be equally searched for a focus alignment position.

A variable focal lens and the imaging apparatus 1 having the same according to an embodiment of the present invention have been described. According to the above described embodiment, in a focus adjustment, the focusing ring 5 is moved in a first moving direction by a predetermined first moving distance, and then in a second moving direction by a predetermined second moving distance, as a result of that the point where the focusing ring 5 reached after the movement in the second moving direction is set to be a reference point for adjustment (in the above described example, the first moving direction is the FAR direction and the second moving direction is the NEAR direction, and the first moving distance is equal to 100 steps and the second moving distance is equal to 200 steps). Moreover, the focusing ring 5 is moved from the reference point for adjustment in the first moving direction within a range equal to or less than the second moving distance to carry out the focus adjustment. Such a control based on a reference point for adjustment enables a detection of a focus alignment position without an absolute position control based on a certain fixed origin. Also, a focus alignment position can be successfully detected without the necessity of margin provided by software at the ends of a movement range. As a result, no reduction of a zoom factor is required, and any origin sensor can be eliminated.

In addition, according to the above described embodiment, the first moving distance is set at ⅛ that of the focusing ring movement range or less, and the second moving distance is set at ¼ that of the focusing ring movement range or less. This achieves a reduced moving distance of a focusing ring for a focus adjustment, resulting in a focus adjustment in a shorter period of time. The focus adjustment can be performed only by a low speed driving unlike the prior art which uses a combination of a high speed driving and a low speed driving.

Furthermore, according to the above described embodiment, the second moving distance is set at twice of that of the first moving distance. This enables a preferable detection of a focus alignment position from an adequate region on both sides of the starting position for a focus adjustment.

Second Embodiment

Next, a variable focal lens and an imaging apparatus having the same according to a second embodiment of the present invention will be explained below.

In comparison between the first embodiment and the second embodiment, in the first embodiment, in an auto-focus adjustment, first a focusing ring is moved by a predetermined first moving distance which is fixedly set. To the contrary, in the second embodiment, a first moving distance is variable. More specifically, it is detected whether a zoom ring is located on a TELE side or a WIDE side. Then, the first moving distance is extended or made longer when the zoom ring located on the WIDE side, as compared to the first moving distance when the zoom ring located on the TELE side. In accordance with the extension, the second moving distance is also changed depending on whether the zoom ring is located on a TELE side or a WIDE side. The second moving distance is extended or made longer when the zoom ring located on the WIDE side. In the following description, the difference between the first and second embodiments will be generally described, and the other features common to the embodiments will be omitted.

Figure 7A:
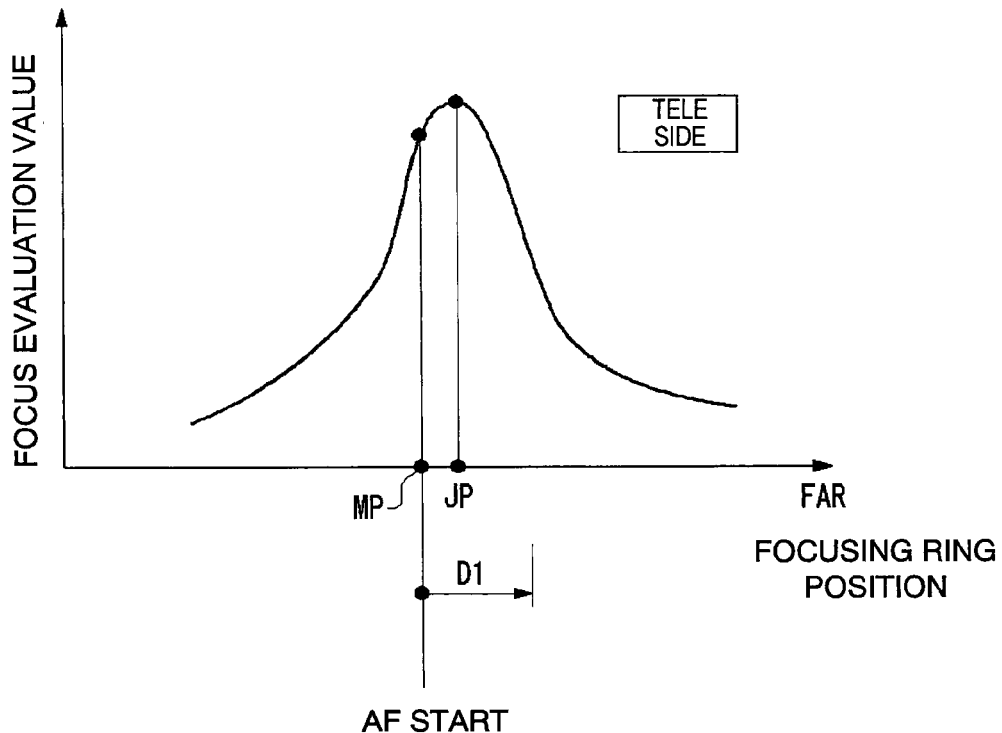
FIG. 7A is a view showing a relationship between a position of a focusing ring and a focus evaluation value when a zoom ring is located on a TELE side.
Figure 7B:
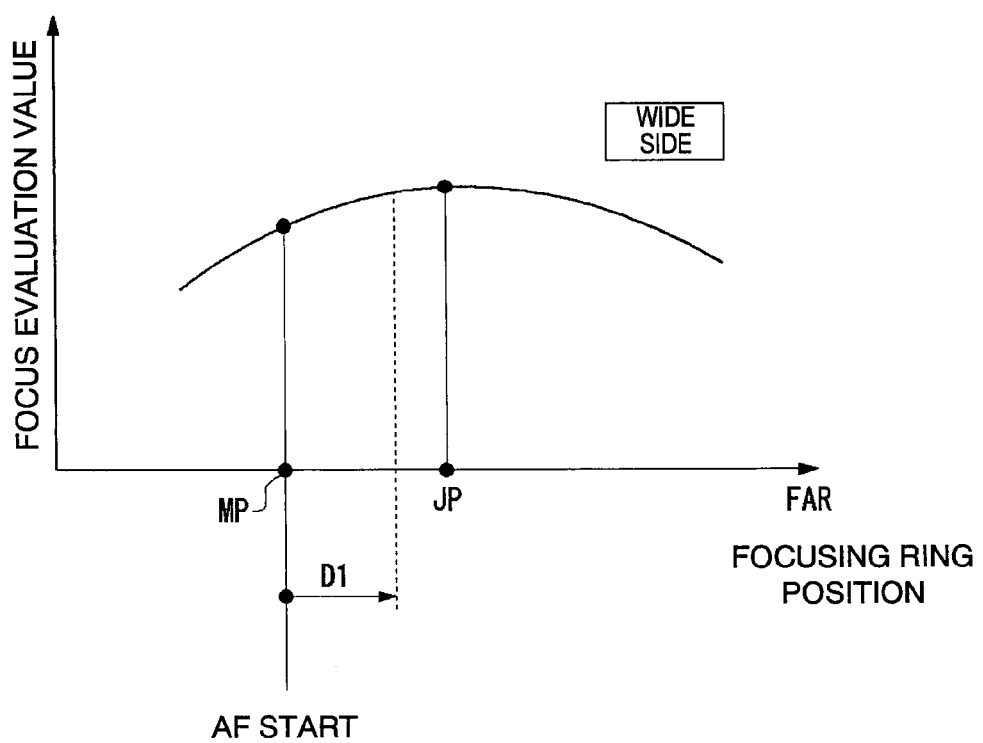
FIG. 7B is a view showing a relationship between a position of a focusing ring and a focus evaluation value when a zoom ring is located on a WIDE side.

First, the background for which the technology of the present embodiment is required will be explained. FIG. 7A and FIG. 7B schematically show the relationship between a focusing ring position and a focus evaluation value when the zoom ring 3 is located on a TELE side and a WIDE side respectively. FIG. 7A shows a case with the zoom ring 3 on a TELE side, and FIG. 7B shows a case with the zoom ring 3 on a WIDE side. For example, a magnification of 3.3 is obtained at the end on the TELE side, and the magnification of 1 is obtained at the end on the WIDE side. In FIG. 7A and FIG. 7B, the point JP represents a focus alignment position. The point MP represents a focusing ring position when a focus adjustment has been manually conducted, that is, a focusing ring position when starting the auto-focus operation. The D1 represents a first moving distance.

As shown in FIG. 7A and FIG. 7B, the maximum of the focus evaluation value is obtained at the focus alignment position JP both on the TELE side and the WIDE side, and the focus evaluation values decrease on both sides of the focus alignment position JP. In comparison between FIG. 7A and FIG. 7B, it depends on a subject, but as shown, the focus evaluation values rapidly decrease on the TELE side, and the focus evaluation values smoothly decrease on the WIDE side.

As described above, on the TELE side, since the focus evaluation values rapidly decrease, a focus adjustment is sensitive and therefore a small movement of a focusing ring is translated into a large change of focusing condition. This means that a less accurate focusing in a manual adjustment will cause a significant out-of-focus image. As a result, as shown in FIG. 7A, the focusing ring position MP comes close to the focus alignment position JP. If a focus adjustment is started by moving a focusing ring from the position MP by a first moving distance D1, the focusing ring passes the focus alignment position JP without fail. Then, as described in the first embodiment, the focus adjustment is achieved.

To the contrary, on the WIDE side, since the focus evaluation values smoothly decrease, a focus adjustment is insensitive, and therefore, a substantial offset of the focusing ring from the focus alignment position JP causes only a slightly out-of-focus image. Thus, a focus adjustment is roughly performed in a manual adjustment, as a result of that, as shown in FIG. 7B, the focusing ring position MP in the manual adjustment may be located significantly far from the focus alignment position JP. In this case, even if a focus adjustment is started by moving a focusing ring from the position MP by a first moving distance D1, the focusing ring does not pass the focus alignment position JP. As a result, in the focus adjustment described in the first embodiment, the focusing ring cannot be move to the true focus alignment position JP. And a position which appears like a focus alignment position but is actually a false position is determined to be a focus position.

The above described problem occurs when a first moving distance D1 is set to be a small value. A sufficiently large first moving distance D1 may avoid the above described problem. In the example of FIG. 7B also, the focusing ring may pass a focus alignment position JP in a movement by a large first moving distance D1.

However, an increased first moving distance D1 is extremely disadvantageous in terms of a time for focus adjustment. For, a first moving distance D1 which is as small as possible is desirable to decrease a time for focus adjustment.

The present embodiment preferably solves the above problem. The present embodiment detects, as will be explained below, a location of a zoom lens on a TELE side/WIDE side, and controls a first moving distance based on the detected result. In this way, the present embodiment sets a first moving distance as small as possible, and at the same time, ensures the focus adjustment ability on the WIDE side.

Figure 8:
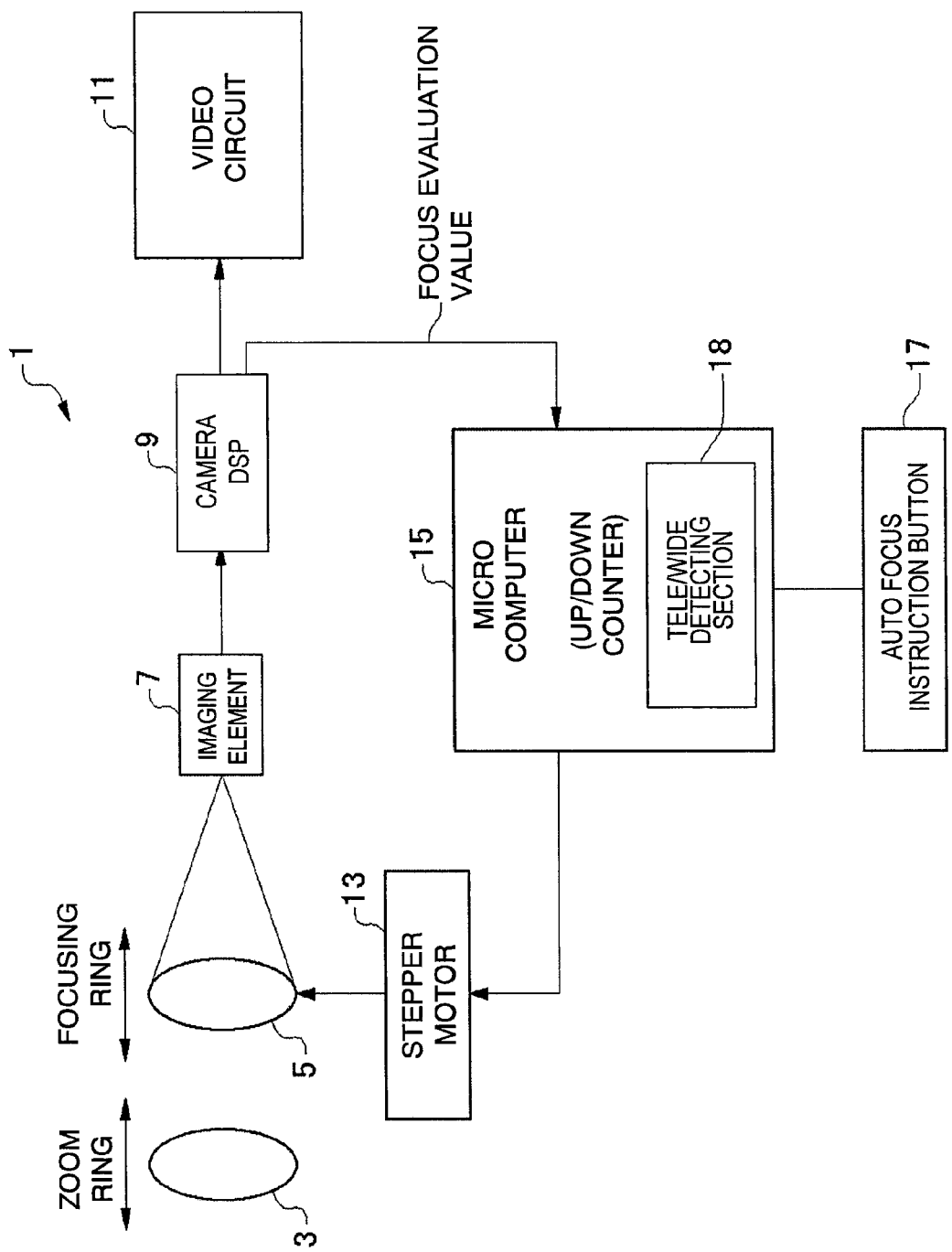
FIG. 8 is a view showing an imaging apparatus having a variable focal lens according to a second embodiment of the present invention.

FIG. 8 shows an imaging apparatus having a variable focal lens according to the present embodiment. As shown, in the present embodiment, a TELE/WIDE detecting section 18 is added as a new component. The TELE/WIDE detecting section 18 is provided in the microcomputer 15 which functions as a focus adjustment section of the present invention. An execution of a program for a TELE/WIDE detecting process, which will be described below, on the microcomputer 15 enables the achievement of the TELE/WIDE detecting section 18.

The TELE/WIDE detecting section 18 detects whether the zoom ring 3 is located on a TELE side or a WIDE side based on a focus evaluation value which is supplied from the camera DSP 9. A focus evaluation value (an AF evaluation value) is an integrated value for all pixels of spatial frequency characteristics, and represents an amount of a high frequency component of an image signal.

Figure 9A:
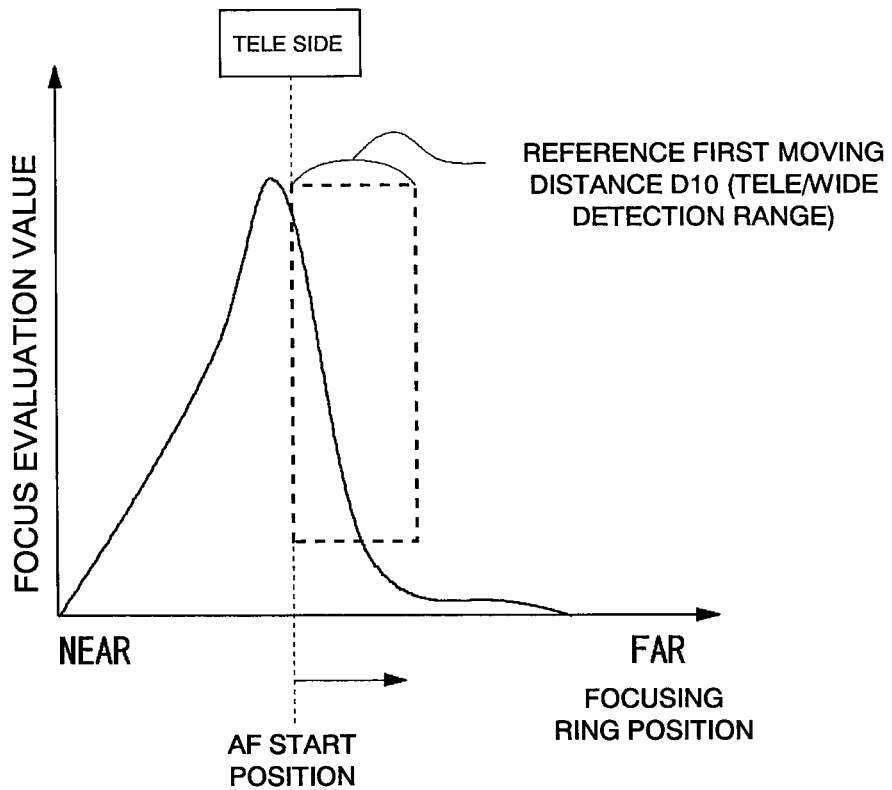
FIG. 9A is a view showing a detection process on a TELE side/WIDE side of a zoom lens.
Figure 9B:
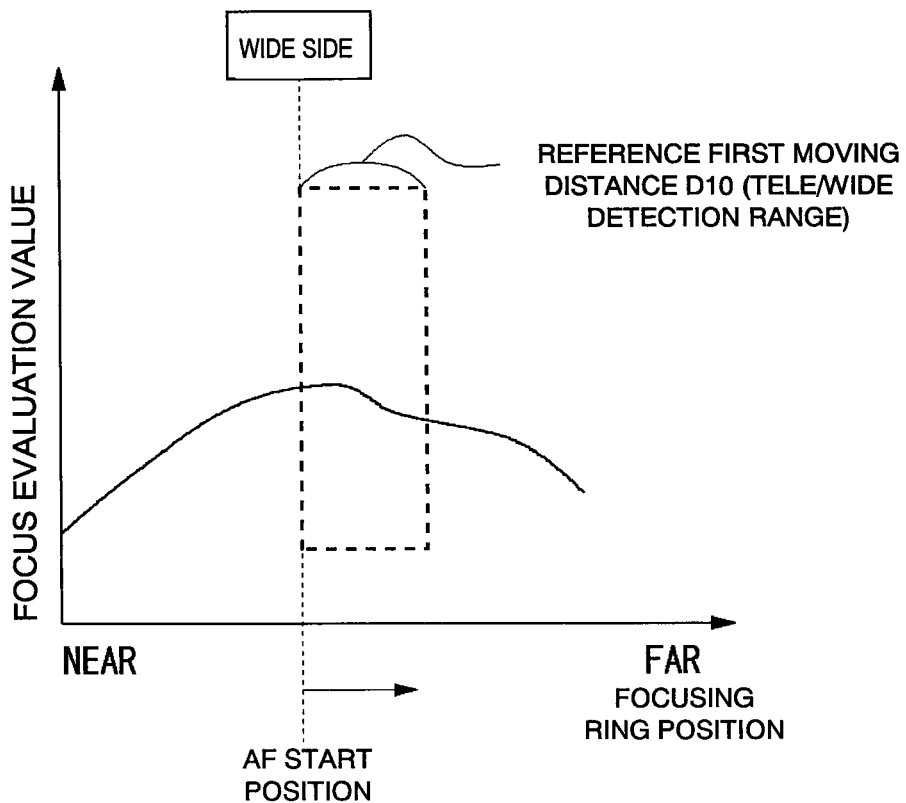
FIG. 9B is a view showing a detection process on a TELE side/WIDE side of a zoom lens.

As shown in FIG. 9A and FIG. 9B, in comparison between the WIDE side and the TELE side, the amount of change in the focus evaluation values according to the focusing ring position are different from each other. The amount changes more greatly on the TELE side than the WIDE side. This change is as described above using FIG. 7A and FIG. 7B. Thus, the TELE/WIDE detecting section 18 proceeds acquired focus evaluation values to obtain the amount of change in the values. Then TELE/WIDE detecting section 18 determines the zoom ring 3 is located on the TELE side when the amount of change in the focus evaluation values is above a predetermined threshold, and determines the zoom ring 3 is located on the WIDE side when the amount of change in the focus evaluation values is equal to or less than the predetermined threshold.

In the present embodiment, the stepper motor 13 is used, so that the position of the focusing ring is represented as the number of steps as described above. Therefore, in a specific structure, the TELE/WIDE detecting section 18 may compare the amount of change in the focus evaluation values per step with a threshold.

In addition, as shown in FIG. 9A and FIG. 9B, the TELE/WIDE detecting section 18 performs the above described detection of the TELE side/WIDE side after a focus adjustment is started and during the focusing ring 5 moves by a reference first moving distance D10. That is, the TELE/WIDE detecting section 18 performs the detection of the TELE side/WIDE side within the reference first moving distance D10.

The microcomputer 15 controls the first moving distance D1 in response to the detection result of the TELE/WIDE detecting section 18. With the zoom ring position on the TELE side, the microcomputer 15 sets the reference first moving distance D10 to be a first moving distance D1. With the zoom ring position on the WIDE side, the microcomputer 15 sets a distance obtained by adding a predetermined extended first moving distance D11 to the reference first moving distance D10 to be a first moving distance D1. The reference first moving distance D10 and the extended first moving distance D11 are preset and stored in the memory of the microcomputer 15, so that the microcomputer 15 can refer to them. In this way, the microcomputer 15 sets a longer first moving distance D1 when the zoom ring 3 is located on the WIDE side as compared to the first moving distance D1 with the zoom ring 3 on the TELE side. In either case, a second moving distance D2 is set at twice that of the first moving distance D1.

Figure 10:
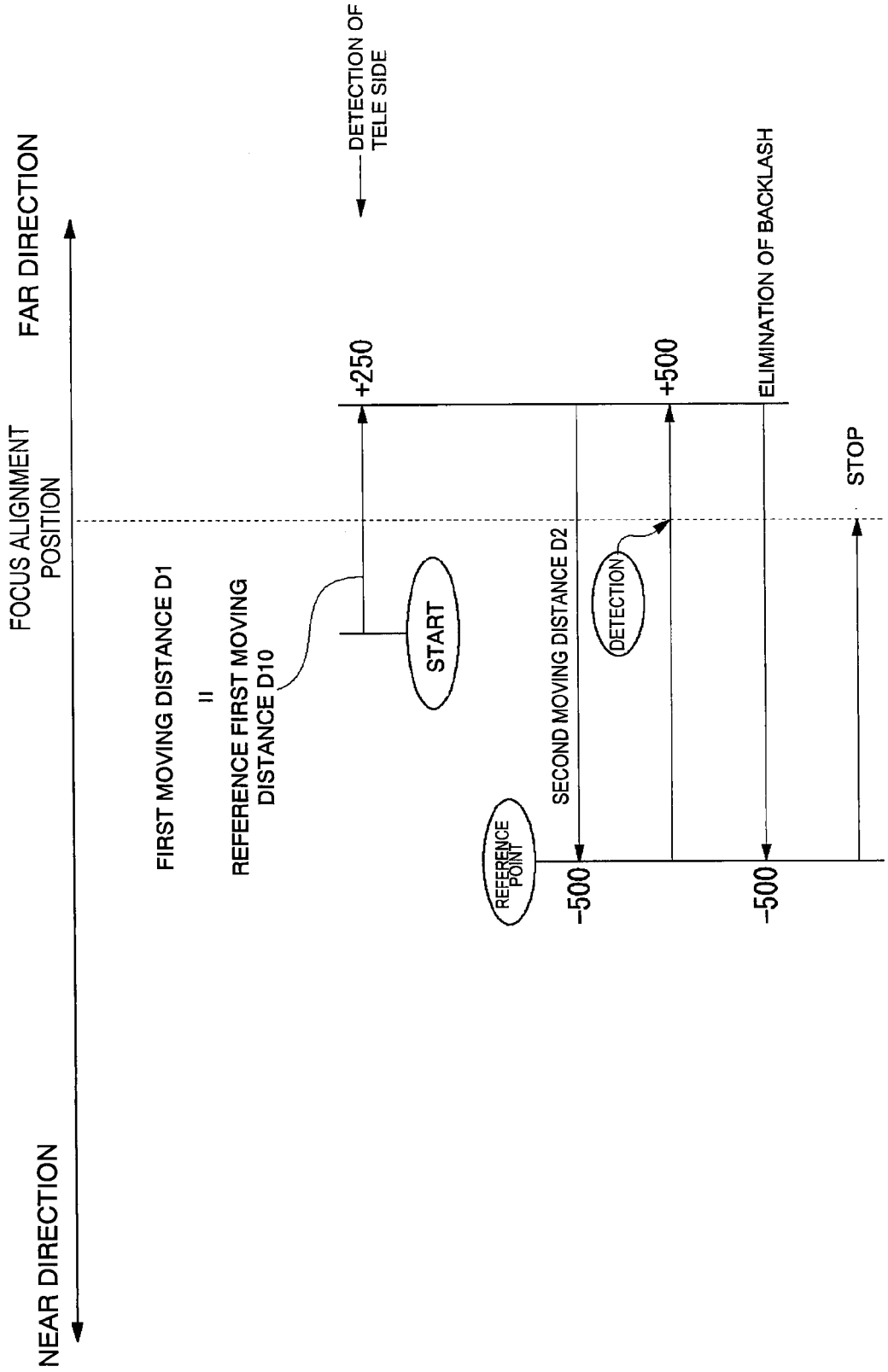
FIG. 10 is a view showing a focus adjustment process according to the second embodiment when a zoom ring is located on a TELE side.
Figure 11:
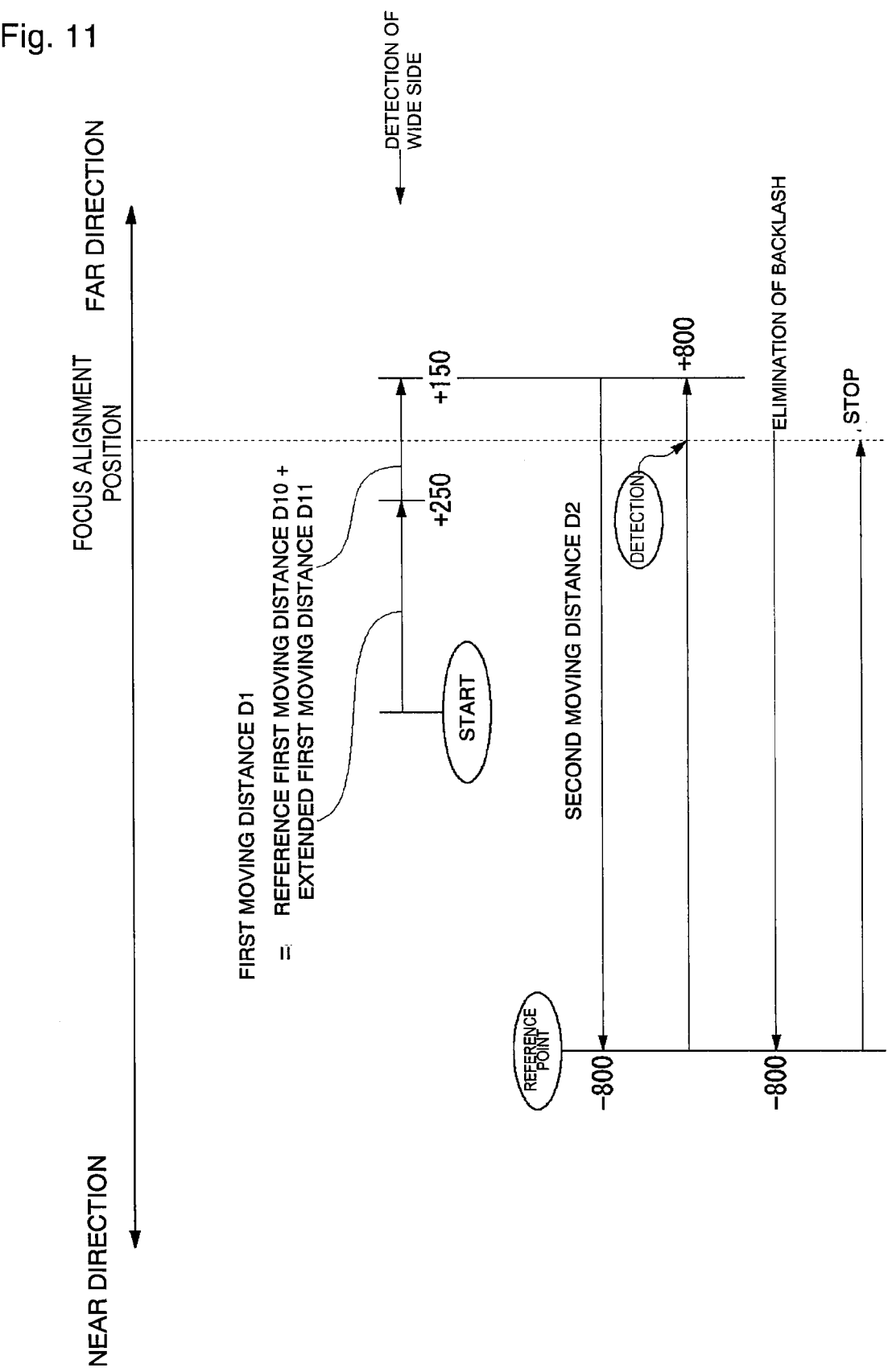
FIG. 11 is a view showing a focus adjustment process according to the second embodiment when a zoom ring is located on a WIDE side.
Figure 12:
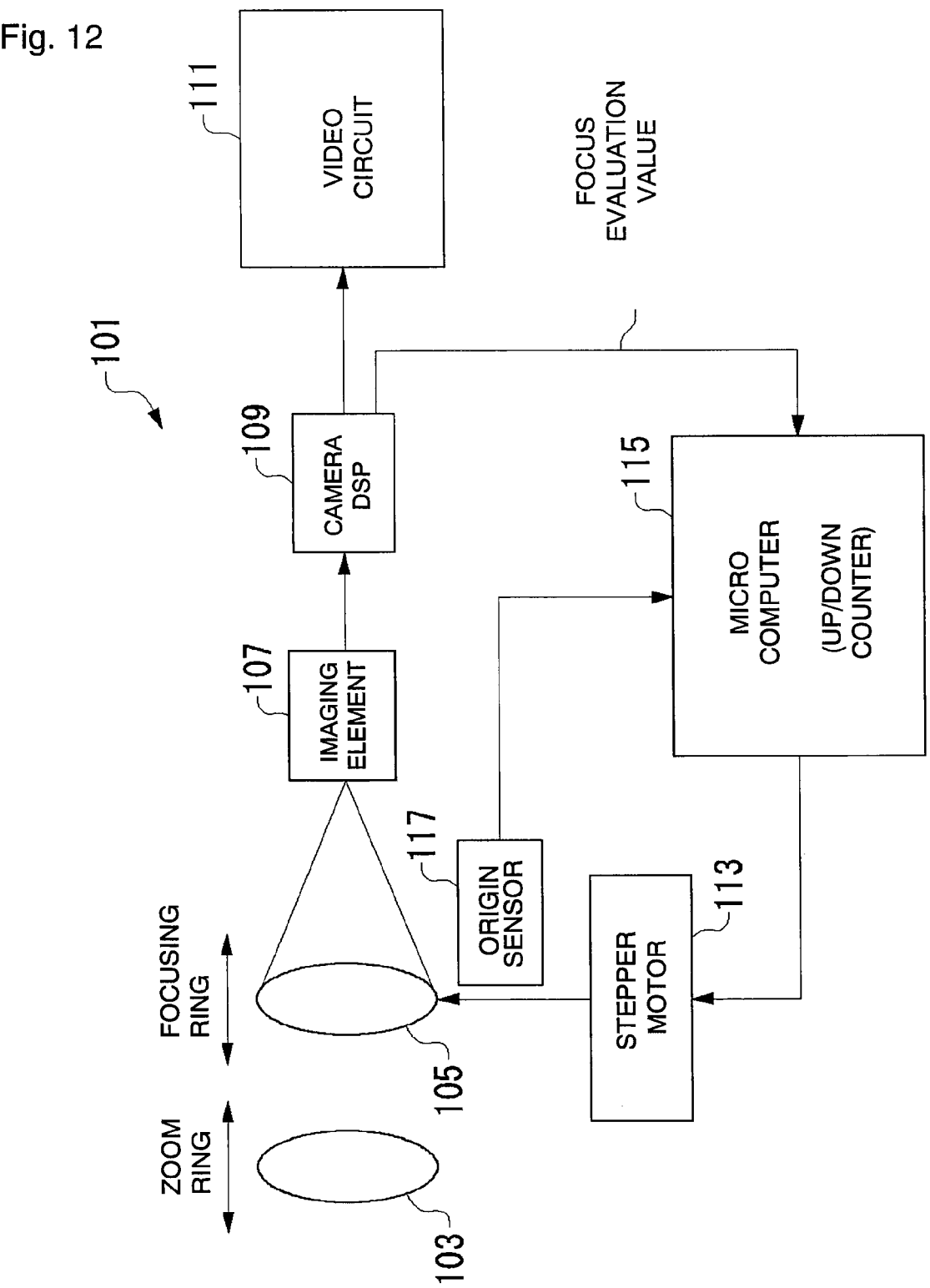
FIG. 12 is a view showing a conventional imaging apparatus having a variable focal lens.
Figure 13A:
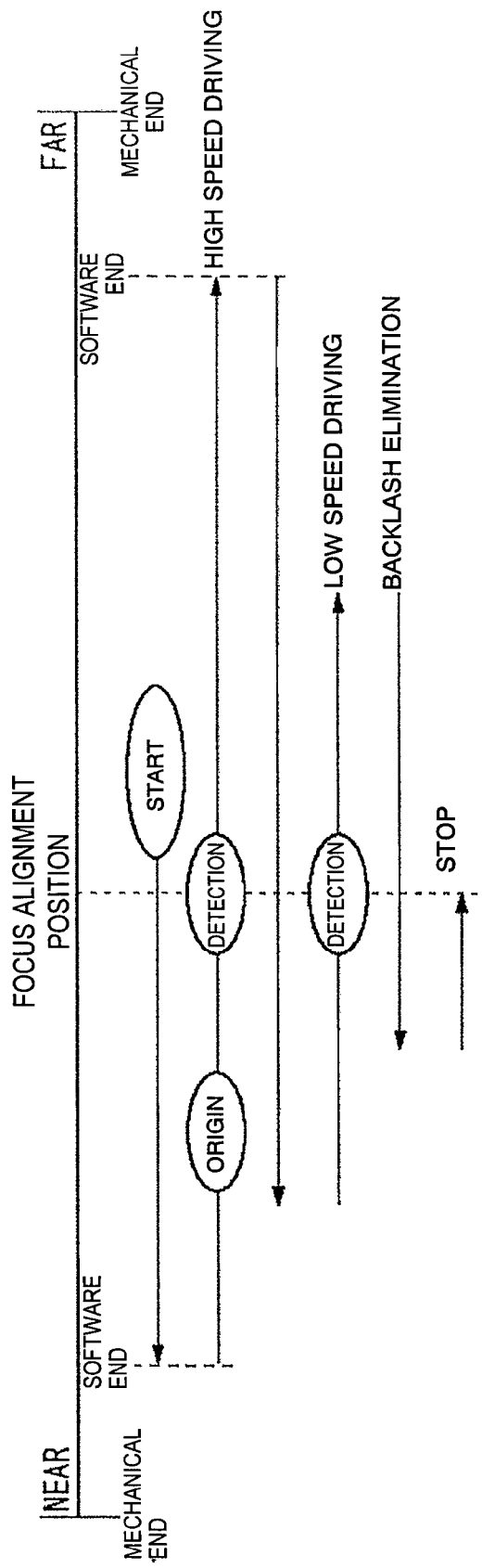
FIG. 13A is a view showing a conventional automatic focusing operation when a focus alignment position is located around the center.
Figure 13B:
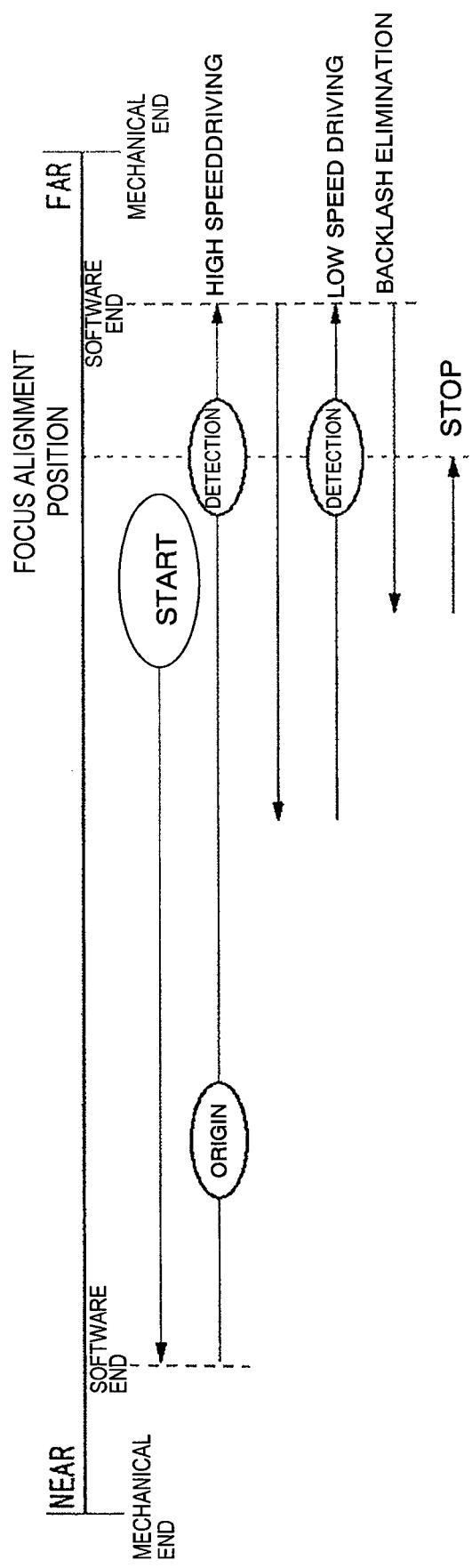
FIG. 13B is a view showing a conventional automatic focusing operation when a focus alignment position is near a FAR end.
Figure 13C:
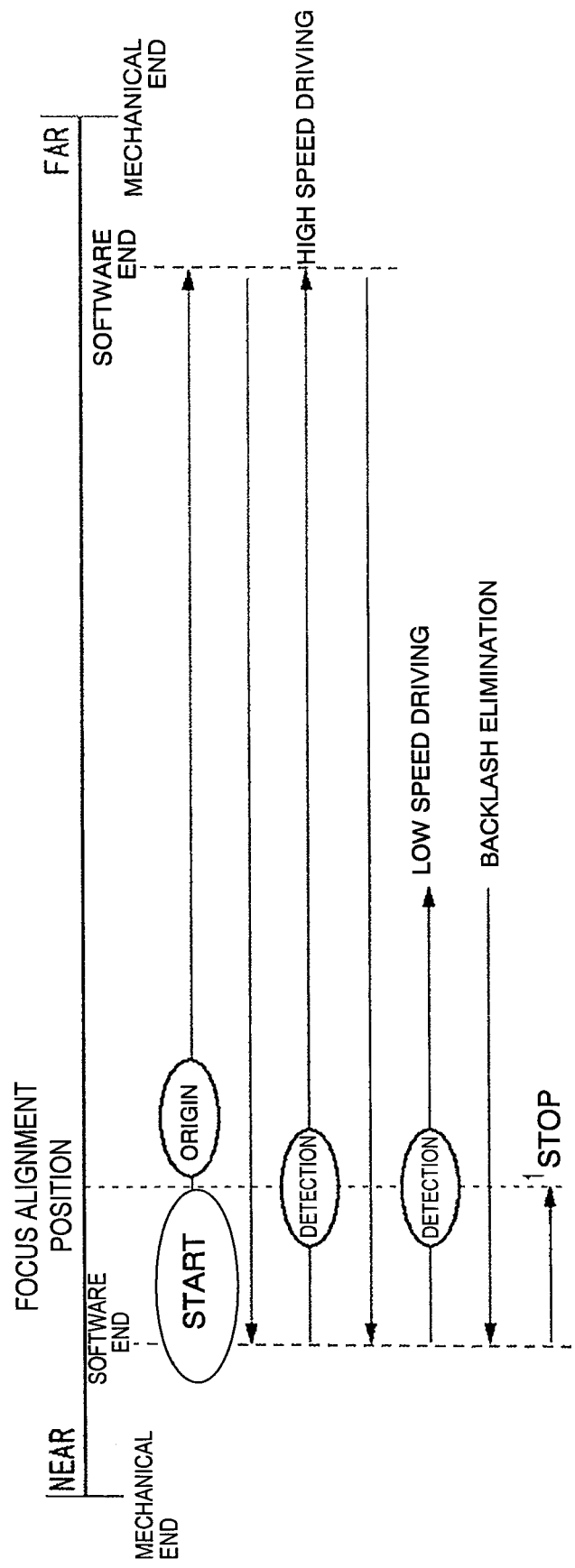
FIG. 13C is a view showing a conventional automatic focusing operation when a focus alignment position is near a NEAR end.

FIG. 10 and FIG. 11 show a control process of the focusing ring position on the TELE side and the WIDE side. FIG. 10 shows the case for the TELE side, and FIG. 11 shows the case for the WIDE side.

Referring to FIG. 10, in the present embodiment, the reference first moving distance D10 is equal to 250 steps. In the example of FIG. 10, in a movement by the reference first moving distance D10, it is detected that the zoom ring 3 is located on the TELE side. In this case, the microcomputer 15 sets the reference first moving distance D10 as a first moving distance D1. That is, the microcomputer 15 reverses the moving direction when the focusing ring 5 has moved by the reference first moving distance D10. Then, the microcomputer 15 causes the focusing ring 5 to move to the NEAR side by a second moving distance D2. The second moving distance D2 is twice that of the first moving distance, and in this case, the second moving distance D2 is equal to 500 steps.

When the focusing ring 5 moved to the NEAR side by the second moving distance D2, the up/down counter is reset, and the position where the focusing ring 5 is located is set to be a reference point for adjustment. After that, the focusing ring 5 is moved to the FAR side and the NEAR side by the second moving distance D2 (500 steps), thereby in the reciprocating process, a focus alignment position is detected. Finally, the focusing ring 5 is moved to the FAR side and stopped at the focus alignment position.

Next, referring to FIG. 11, in a movement by a reference first moving distance D10, if it is detected that the zoom ring 3 is located on the WIDE side, the microcomputer 15 sets a distance which is obtained by adding an extended first moving distance D11 to the reference first moving distance D10 to be a first moving distance D1. That is, the microcomputer 15 continues to move the focusing ring 5 even when the focusing ring 5 has reached the reference first moving distance D10, and the focusing ring 5 is further moved by the extended first moving distance D11. Thereby, the end point of the movement in the first moving direction is extended and offset by the extended first moving distance D11. In the example of FIG.

11, the extended first moving distance D11 is equal to 150 steps. In this case, the first moving distance D1 is totally equal to 400 steps (=250 steps+150 steps). The subsequent process is done in the same way as in the example for the TELE side of FIG. 10. However, the second moving distance D2 is twice that of the first moving distance D1, that is, is equal to 800 steps. In this way, when the zoom ring 3 is located on the WIDE side, the range for searching a focus alignment position is enlarged.

In comparison between the above described FIG. 10 and FIG. 11, in the example of FIG. 10, because the zoom ring 3 is located on the TELE, a relatively accurate manual adjustment can be done, and thereby the start position of the focus adjustment process is close to the focus alignment position. Therefore, only the movement of the focusing ring 5 by the reference first moving distance D10 (250 steps) allows the focusing ring 5 to pass over the focus alignment position, so that eventually the focusing ring 5 can be stopped at the focus alignment position without fail.

To the contrary, in the example of FIG. 11, because the zoom ring 3 is located on the WIDE side, a rough manual adjustment is done, and thereby the start position of the focus adjustment process is far from the focus alignment position. If a process of the present embodiment is not applied, the focusing ring 5 would go back before it passes the focus alignment position. As a result, a true focus alignment position would not be detected, and the focusing ring 5 would stop at a false position. Such a situation can be prevented according to the present embodiment. That is, as shown, when the WIDE side is detected, a first moving distance D1 is extended, thereby the focusing ring 5 is able to pass over a focus alignment position. This allows the true focus alignment position to be included in the auto focus search range, so that an accurate focus adjustment can be performed.

In the above operation shown in FIG. 10 and FIG. 11, no explanation was made about a case where a step out of the stepper motor 13 occurs. However, the control of the present embodiment enables a focus adjustment by the same process as that explained in the first embodiment by way of FIG. 4 to FIG. 6, regardless of a step out of a motor. This is same as described above in the first embodiment, and will not be explained again. However, in the example of FIG. 5 in the first embodiment, a step out of a motor occurs at an early stage of detection. In consideration of such an early step out, preferably a detection of a TELE side/WIDE side is carried out immediately after a movement of the focusing ring 5 is started. For example, a TELE side/WIDE side may be detected in a few steps after a movement of the focusing ring 5 is started.

In comparison between the auto focus process in the second embodiment (FIG. 10 and FIG. 11) and that in the first embodiment (for example, FIG. 4), the number of steps (moving) in the second embodiment is generally larger than those in the first embodiment. The number of steps may be appropriately set in accordance with a specification of an imaging apparatus.

In addition, in comparison between the auto focus process in the second embodiment (FIG. 10 and FIG. 11) and that in the first embodiment (for example, FIG. 4), the distance by which the focusing ring 5 goes back to the NEAR side after a detection of a focus alignment position is set longer in the second embodiment. Specifically, in the first embodiment, the focusing ring 5 goes back to slightly pass over a focus alignment position, while in the second embodiment, the focusing ring 5 goes back to a reference point. The focusing ring 5 may go back in either way within the scope of the present invention.

A focus adjustment process according to the present embodiment has been explained. Finally, an explanation about a setting of a TELE side/WIDE side will be added. The boundary between a TELE side and a WIDE side may be appropriately set as far as the effect of the present invention can be preferably obtained. A higher threshold for TELE/WIDE detection causes the TELE side to be narrower and the WIDE side to be broader. Conversely, a lower threshold causes the TELE side to be broader and the WIDE side to be narrower. A broader WIDE side increases the chances to use a broader search range. Therefore, generally, the accuracy of focus adjustment is improved, but the period of time focus adjustment is increased. Conversely, the narrower WIDE side increases the chances to use a narrower search range. Therefore, generally, the period of focus adjustment is reduced, but it is disadvantageous for the accuracy in focus adjustment. On the whole, it is preferable to decrease a threshold for detection to the extent that the accuracy of focus adjustment is ensured, so as to narrow the region on the WIDE side.

A variable focal lens and the imaging apparatus 1 having the same according to the second embodiment of the present invention have been explained. According to the present embodiment, it is detected whether a zoom ring is located on a TELE side or a WIDE side. Then, when the zoom ring is located on a WIDE side, a first moving distance is increased as compared to that when the zoom ring is located on a TELE side. Therefore, on the Tele side, the period for the focus adjustment can be shortened by reducing the focusing ring moving distance, while, on the WIDE side, the focus adjustment can be surely achieved by securing the adequate focusing ring moving distance.

According to the present embodiment, a detection of a TELE side/WIDE side is performed using a focus evaluation value which represents an integrated value for spatial frequency characteristics of an image signal and the amount of change in the focus evaluation values, based on the characteristics of the focus evaluation value: that is, the amount of change in the focus evaluation values when the focusing ring moves is smaller on the WIDE side as compared to that on the TELE side. This configuration using a focus evaluation value enables a detection on a TELE side and a WIDE side without using a special sensor or the like, thereby the present invention can be achieved with a simple structure.

Also, in a focus adjustment process according to the present embodiment, a reference first moving distance is set to be a first moving distance when a zoom ring is located on a TELE side, and a distance which is obtained by adding an extended first moving distance to the reference first moving distances set to be a first moving distance when a zoom ring is located on a WIDE side. This setting allows a first moving distance to be preferably different when a zoom ring is located on a TELE side and a WIDE side.

In addition, according to the present embodiment, during a focusing ring is moving in a first moving direction by a reference first moving distance, a detection of TELE side/WIDE side is performed using a focus evaluation value. So, during the movement by a reference first moving distance, a detection of TELE side/WIDE side and also a determination if an extended first moving distance should be added or not are performed. During the movement by a reference first moving distance, a TELE/WIDE detecting process is done. Therefore, although a focus evaluation value obtained from an image signal is used, a focus adjustment can be rapidly achieved without wasting time in a TELE/WIDE detecting process.

While the preferable embodiments of the present invention which are possible at present have been explained, it should be understood that a number of modifications to the present embodiments can be added, and it is intended that such modifications within the true spirit and scope of the present invention are also included in the scope of the appended claim.

INDUSTRIAL APPLICABILITY

As described above, a variable focal lens according to the present invention does not require a reduction of a zoom factor, effectively eliminates an origin sensor, and is useful as a lens of a monitoring camera and the like.

The invention claimed is:

1. A variable focal lens, comprising:
   a zoom ring;
   a focusing ring;
   a stepper motor for moving the focusing ring to a FAR side and a NEAR side; and
   a focus adjustment section for controlling the stepper motor to move the focusing ring for a focus adjustment, and
   wherein the focus adjustment section causes the focusing ring to move by a first moving distance in a first moving direction toward one of the FAR side and the NEAR side, and then to move the focusing ring by a second moving distance which is larger than the first moving distance and equal to or less than a focusing ring movement range in a second moving direction opposite to the first moving direction, and set the end point where the focusing ring reaches after the movement in the second moving direction as a reference point for adjustment by resetting an up/down counter, and the focus adjustment section causes the focusing ring to move from the reference point for adjustment in the first moving direction within a range equal to or less than the second moving distance to carry out the focus adjustment.

2. The variable focal lens according to claim 1, wherein the first moving distance is set at ⅛ distance of the focusing ring movement range or less, and the second moving distance is set at ¼ distance of the focusing ring movement range or less.

3. The variable focal lens according to claim 1, wherein the second moving distance is set at twice the value of the first moving distance.

4. The variable focal lens according to claim 1, wherein the focus adjustment section includes a TELE/WIDE detecting section which detects whether the zoom ring is located on a TELE side or a WIDE side, and makes the first moving distance longer when the zoom ring is located on the WIDE side as compared to the first moving distance when the zoom ring is located on the TELE side.

5. The variable focal lens according to claim 4, wherein the TELE/WIDE detecting section employs a focus evaluation value which represents an integrated value for spatial frequency characteristics of an image signal, so as to detect whether the zoom ring is located on a TELE side or a WIDE side according to the amount of change in the focus evaluation values, based on the characteristics of the focus evaluation value that the amount of change in the focus evaluation values on movement of the focusing lens is smaller on the WIDE side as compared to that on the TELE side.

6. The variable focal lens according to claim 5, wherein the focus adjustment section sets a reference first moving distance as the first moving distance when the zoom ring is located on the TELE side, and when the zoom ring is located on the WIDE side, the focus adjustment section sets a distance which is obtained by adding an extended first moving distance to the reference first moving distance as the first moving distance.

7. The variable focal lens according to claim 6, wherein the TELE/WIDE detecting section detects a TELE side/WIDE side using the focus evaluation values while the focusing ring is moving in the first moving direction by the reference first moving distance.

8. An imaging apparatus, comprising:
   a zoom ring;
   a focusing ring;
   an imaging element;
   a stepper motor for moving the focusing ring to a FAR side and a NEAR side; and
   a focus adjustment section for controlling the stepper motor according to a focus evaluation value which is generated from an image signal of the imaging element so as to move the focusing ring for a focus adjustment, and
   the focus adjustment section causes the focusing ring to move by a first moving distance in a first moving direction toward one of the FAR side and the NEAR side, and then to move the focusing ring by a second moving distance which is larger than the first moving distance and equal to or less than a focusing ring movement range in a second moving direction opposite to the first moving direction, and set the end point where the focusing ring reaches after the movement in the second moving direction as a reference point for adjustment by resetting an up/down counter, the focus adjustment section causes the focusing ring to move from the reference point for adjustment in the first moving direction within a range equal to or less than the second moving distance to carry out the focus adjustment.

9. The imaging apparatus according to claim 8, wherein the focus adjustment section includes a TELE/WIDE detecting section which detects whether the zoom ring is located on a TELE side or a WIDE side, and makes the first moving distance longer when the zoom ring is located on the WIDE side as compared to the first moving distance when the zoom ring is located on the TELE side.

10. An auto-focus method which is applied to a variable focal lens having a zoom ring, a focusing ring, a stepper motor for moving the focusing ring to a FAR side and a NEAR side, and for a focus adjustment by controlling the stepper motor to move the focusing ring, the auto-focus method comprising:
    moving the focusing ring by a first moving distance in a first moving direction toward one of the FAR side and the NEAR side;
    moving the focusing ring by a second moving distance which is set to be larger than the first moving distance and equal to or less than a focusing ring movement range in a second moving direction opposite to the first moving direction;
    setting the end point where the focusing ring reaches after the movement in the second moving direction as a reference point for adjustment by resetting an up/down counter; and
    moving the focusing ring from the reference point for adjustment in the first moving direction within a range equal to or less than the second moving distance to carry out the focus adjustment.

11. The auto-focus method according to claim 10, comprising:
    detecting whether the zoom ring is located on a TELE side or a WIDE side; and
    extending the first moving distance when the zoom ring is located on the WIDE side as compared to the first moving distance when the zoom ring is located on the TELE side.

* * * * *